United States Patent
Ricks et al.

(10) Patent No.: US 7,437,642 B1
(45) Date of Patent: Oct. 14, 2008

(54) MODEL TRAIN COMMAND PROTOCOL USING FRONT AND BACK ERROR BYTES

(75) Inventors: John T. Ricks, Lincoln Park, MI (US); Louis G. Kovach, II, Belleville, MI (US); Neil Young, Woodside, CA (US)

(73) Assignee: Liontech Trains LLC, Chesterfield, MI (US)

( * ) Notice: Subject to any disclaimer, the term of this patent is extended or adjusted under 35 U.S.C. 154(b) by 473 days.

(21) Appl. No.: 11/187,592

(22) Filed: Jul. 22, 2005

(51) Int. Cl.
*G01R 31/28* (2006.01)

(52) U.S. Cl. .................. 714/732; 714/799; 246/187 A; 246/4

(58) Field of Classification Search .................. 714/732, 714/799; 246/187 A, 4
See application file for complete search history.

(56) References Cited

U.S. PATENT DOCUMENTS

| | | | | |
|---|---|---|---|---|
| 5,375,127 A | * | 12/1994 | Leak et al. .................. | 714/772 |
| 6,052,815 A | * | 4/2000 | Zook .......................... | 714/758 |
| 6,134,597 A | * | 10/2000 | Rieth et al. ................. | 709/237 |
| 6,357,032 B1 | * | 3/2002 | Plotz et al. .................. | 714/758 |
| 6,678,837 B1 | * | 1/2004 | Quach et al. ................. | 714/38 |
| 7,364,122 B2 | * | 4/2008 | Kovach et al. ................ | 246/4 |
| 2003/0163760 A1 | * | 8/2003 | Watanabe et al. ............. | 714/10 |
| 2003/0190078 A1 | * | 10/2003 | Govindaswamy et al. ... | 382/232 |
| 2005/0195818 A1 | * | 9/2005 | Hasegawa et al. ........... | 370/390 |
| 2006/0151673 A1 | * | 7/2006 | Ritota et al. ............ | 246/187 A |

* cited by examiner

*Primary Examiner*—Mujtaba K Chaudry
(74) *Attorney, Agent, or Firm*—O'Melveny & Myers LLP

(57) ABSTRACT

A model train command protocol using front and back error bytes is disclosed. The front error byte is used to encode the data so that it is securely transmitted. The back error byte checks for proper transmission of the data itself. The entire encoded data sequence is known as a signature. The signature is sent by a user via a remote base through a communication link in a model train system. A receiver located within the model train system decodes the signature and executes the command.

21 Claims, 8 Drawing Sheets

Table of Functions

| Value of Function Bits | | Description |
|---|---|---|
| 0 | 0 | Inverse Function/Count Byte: Second Byte from the End of Data Field Function Operation: Compliment All Data Field Bytes Including the Inverse Function/Count Byte |
| 0 | 1 | Inverse Function/Count Byte: First Byte in Data Field Function Operation: XOR All Data Field Bytes Using the Function/Count Byte as the Mask |
| 1 | 0 | Inverse Function/Count Byte: Last Byte in Data Field Function Operation: ADD the Inverse Function/Count Byte to All Data Field Bytes, then SWAP the Results |
| 1 | 1 | Random Byte: Second to Last Byte in the Data Field Function Operation: XOR Fixed Value 0xAA to the Data Field, then ADD the Function/Count Byte to the Result |

FIG. 5

MODEL TRAIN COMMAND PROTOCOL USING FRONT AND BACK ERROR BYTES

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to data protocols, and in particular command protocols for model trains.

A variety of control systems are used to control model trains. In one system, the power to the track is increased, or decreased, to control the speed and direction of the train. Multiple trains can be controlled by providing different power levels to the different sections of the track having different trains.

In another type of control system, a coded signal is sent along the track, and addressed to the desired train, giving it a speed and direction. The train itself controls its speed by converting the AC voltage on the track into the desired DC motor voltage for the train according to the received instructions. The instructions can also tell the train to turn on or off its lights, horns, etc. U.S. Pat. Nos. 5,441,223 and 5,749,547 issued to Neil Young et al. show such a system.

FIG. 1A is a perspective drawing of an example layout of a conventional model train system allowing the one-way communication of signals from a base unit to a locomotive and other components.

A hand-held remote control unit 12 is used to transmit signals to a base unit 14 and to a power master unit 150 both of which are connected to train tracks 16. Base unit 14 receives power through an AC adapter 18. A separate transformer 20 is connected to track 16 to apply power to the tracks through power master unit 150. Power master unit 150 is used to control the delivery of power to the track 16 and also is used to superimpose DC control signals on the AC power signal upon request by command signals from the hand-held remote control unit 12.

Power master unit 150 modulates AC track power to the track 16 and also superimposes DC control signals on the track to control special effects and locomotive 24'. Locomotive 24' is, e.g., a standard Lionel locomotive powered by AC track power and receptive to DC control signals for, e.g., sound effects.

455 kHz transmitter 33 of base unit 14 is configured to transmit an outgoing RF signal between the track and earth ground, which generates an electromagnetic field indicated by lines 22 which propagates along the track. This field will pass through a locomotive 24 and will be received by a capacity antenna located inside the locomotive.

FIG. 1B is a simplified schematic drawing of the conventional system shown in FIG. 1A. FIG. 1B shows a cross-sectional view of locomotive 24, which may be, e.g., a standard locomotive retrofitted or designed to carry antenna 26. The signal will then be communicated from antenna 26 to 455 kHz receiver 37 of engine 24. Locomotive 26 further includes a processor 84 in communication with receiver 37 and configured to interpret the received signal.

Returning to FIG. 1A, receipt of control signals is not limited to moving elements of the train set. The electromagnetic field generated by base unit 14 will also propagate along a line 28 to a switch controller 30. Switch controller 30 also has a receiver in it, and will itself transmit control signals to various devices, such as the track switching module 32 or a moving flag 34.

The use of both base unit 14 and power master unit 150 allows operation and control of several types of locomotives on a single track layout. Locomotives 24 which have been retrofitted or designed to carry receiver 26 are receptive to control signals delivered via base unit 14. Standard locomotives 24' which have not been so retrofitted may be controlled using DC offset signals produced by power master unit 150.

The remote unit can transmit commands wirelessly to base unit 14, power master unit 150, accessories such as accessory 31, and could transmit directly to train engines instead of through the tracks. Such a transmission directly to the train engine could be used for newer engines with a wireless receiver, while older train engines would continue to receive commands through the tracks.

The communication of signals to moveable and stationary components of a model train as described above, offers a number of advantages. Furthermore, even more advantages would be conferred by the ability to securely transmit and receive communication signals to a model train system. Such information could be used to produce effects that mimic realistic actions of a locomotive, such as engine sounds, etc.

A railroad communication system is disclosed in U.S. Pat. No. 4,582,280. A radio communication control system allows for a lead unit to communicate with a plurality of remote units. The radio communication channel between the lead unit and the remote units also signals responses by the remote units to the commands from the lead unit. A functional radio communications link between a lead unit and a remote unit is not established until unique addressing information has been exchanged between the lead unit and the remote unit and comparisons have been made.

Examples of desired signals to be sent and received to the train cars are described in U.S. Pat. No. 3,664,060 issued to Longnecker. Simulated bell sounds, whistles, and steam blowoff sounds are examples of realistic locomotive sounds to be used in model train systems. Other signals include the control of coil couplers which link two cars together.

It is an object to provide a secure model train command protocol within a model train communication system.

BRIEF SUMMARY OF THE INVENTION

The present invention provides a unique method for encoding a signature made up of a group of bytes to be transmitted in a model train communication system. The signature consists of two error fields, which are located on the ends (i.e., front and back) of the signature. In addition, a function/count field is located in between the error fields, where the function field indicates the manner in which the desired command is to be encoded, and the count field indicates how many bytes the command encompasses.

There are a number of advantages of the present invention. The use of error fields at both ends of a signature protects against misinterpretation of a message, where the ends of a message could be corrupt or overlap with a neighboring message during transmission. In addition, the variable length of the signature allows for any sized command to be encoded and decoded. Also, while the transmission and reception of a signature is located in the public domain, the present invention provides a secure signature and unique identification method while encoding or decoding the data.

An embodiment of the present invention comprises a specific relationship between the error fields. Specifically, the second error field is the inverse of the first error field. The first error field is used to encode part of the signature, and the second error field is used to check that the signature has been properly received.

A further embodiment of the present invention comprises a function field that specifies the location of a random field in a data field located within a signature. The random field increases the possible encoded patterns that can be created within any given data set to make it more difficult to decipher the signature without knowledge of the encoding method.

A further embodiment of the present invention comprises a unique method for decoding a signature to be received in a model train communication system. In order to verify that the signature was properly received, the first error field is compared to the second error field, to verify that the inverse of the second error field still matches the first error field. Then, the number of bytes received is compared to the count field to verify that they match. Also, the first error field is compared to the data field itself. After verifying that the above is satisfactory, the function/count field is analyzed to decode the signature, whereby the desired command is extracted and implemented by the model train system.

BRIEF DESCRIPTION OF THE DRAWINGS

FIG. 5 is an example of a function table used to illustrate the possible methods of encoding a data field.

DETAILED DESCRIPTION OF THE INVENTION

System

Figure 1A:
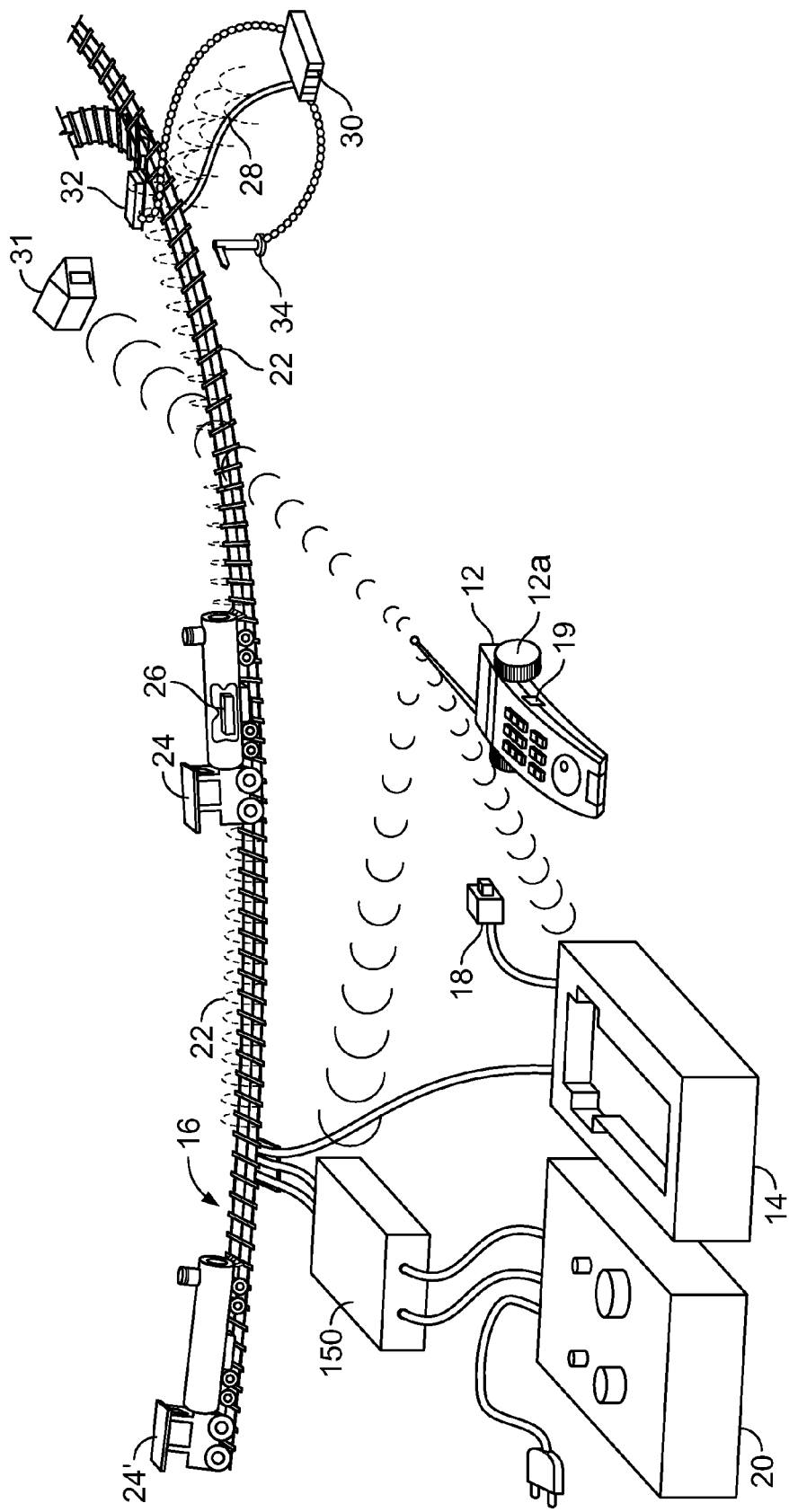
FIG. 1A illustrates a perspective view of an example of a model train system having commands transmitted to a train engine and accessories on the train layout.
Figure 1B:
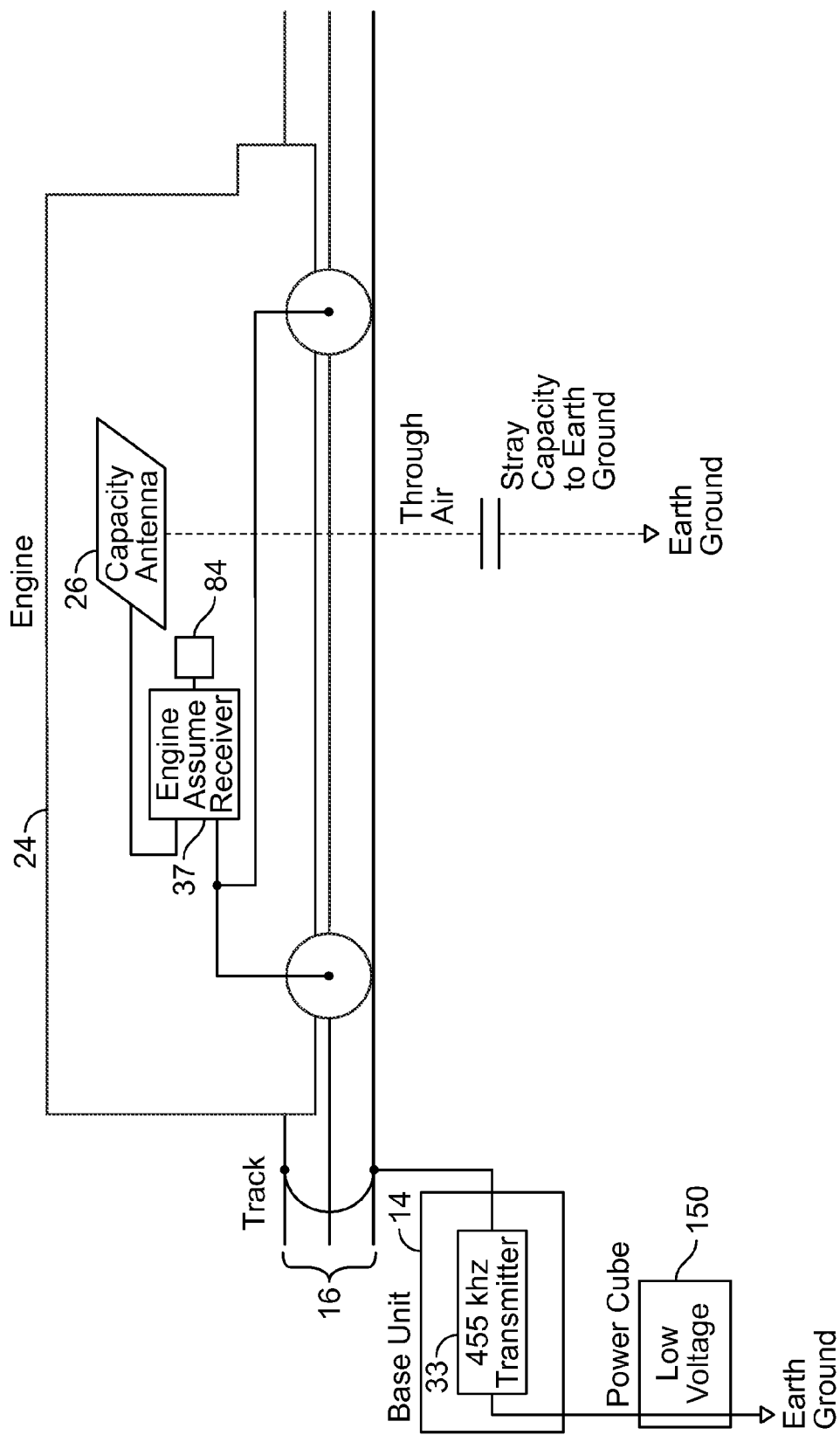
FIG. 1B illustrates a simplified schematic view of the model train system of FIG. 1A.
Figure 2:
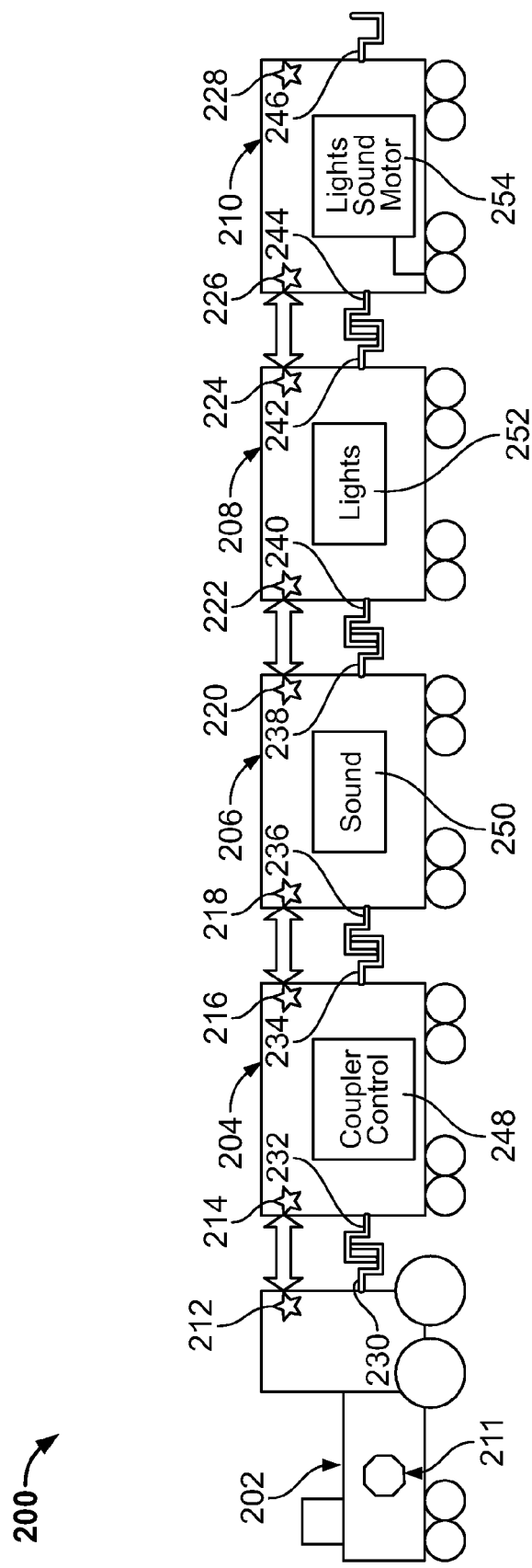
FIG. 2 illustrates an example of a model train system where a locomotive pulls the rest of the locomotive cars in a train.

FIG. 2 illustrates an example of an embodiment of a model train system. Locomotive 202 contains a motor to pull locomotive cars 204-210. Located within locomotive 202 is receiver 211, which has the ability to obtain signals from remote command base 14, where a user can use remote control 12 and send commands to the train. A microcontroller and memory in the engine receive the commands from the receiver and do the processing described herein. A communication link may also be established in the model train. The model train in FIG. 2 contains a series of wireless transceivers 212-228 which transfer data from car to car. Microprocessors or other circuitry may be located on each train car with the ability to process such data and forward this information through the communication link. Examples of commands to be sent to locomotive 202 are opening/closing couplers (such as coupler 230 and 232) that connect cars together, producing a bell or whistle sound, turning on/off lights, etc. Each car on the train may have the capability of executing such commands.

Order of Bytes in Signature

Figure 3:
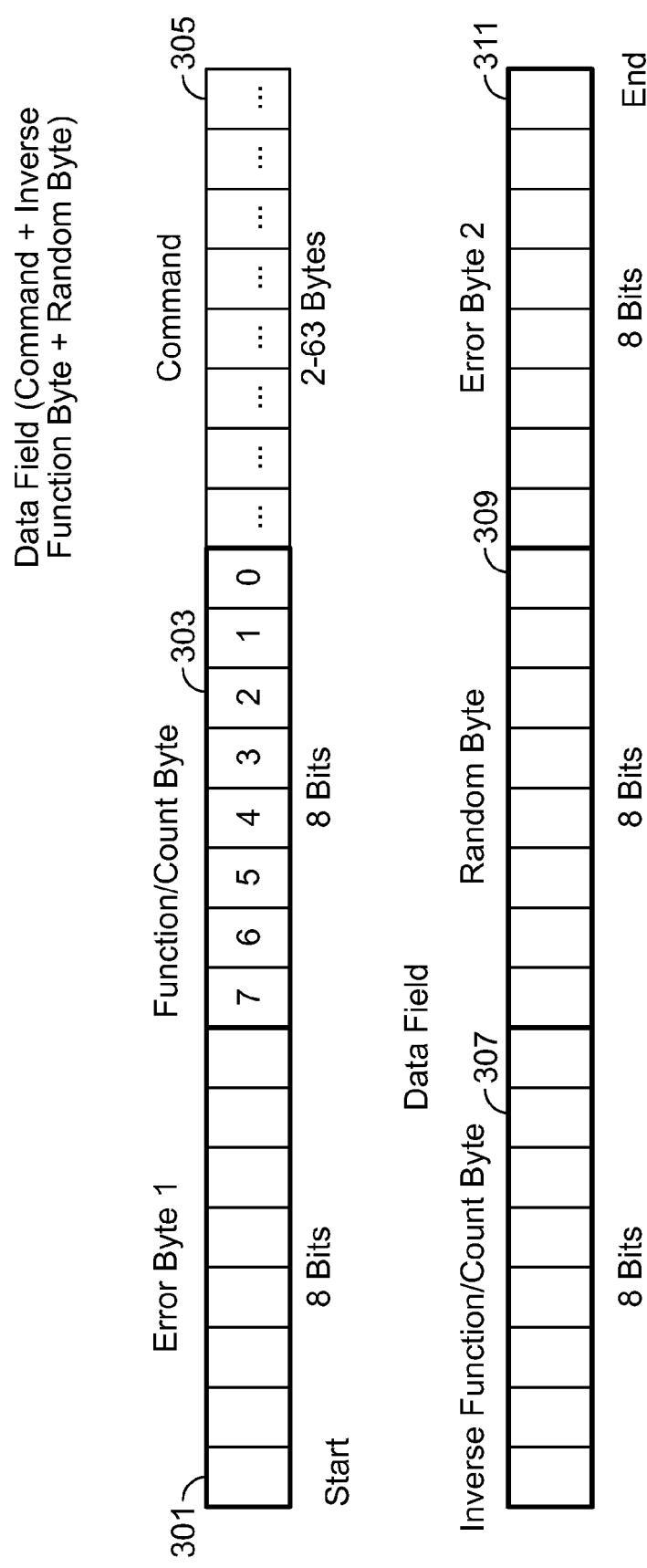
FIG. 3 illustrates the composition of a signature, where the signature includes two error fields, a function/count field, and a data field, which includes the command, inverse function/count field, and random field.

FIG. 3 illustrates an embodiment of the present invention. A signature is the unique encoded number sequence which will be transmitted and received by the model train communication system. Error byte 301 is placed in the first position of the signature. Error byte 311 is placed in the last position of the signature. Function/count byte 303 is located between first error byte 301 and the data field. The data field itself consists of three parts: command 305, inverse function byte 307, and random byte 309. It should be appreciated that a 'field' can represent any number of bits of data to be transmitted within the communication system. In other words, command 305, inverse function byte 307, and random byte 309 may consist of any number of bytes. In alternate embodiments of the present invention, inverse function byte 307 and random byte 309 are placed in varying locations within the data field. The positions of error byte 301, function/count byte 303, and error byte 311 are fixed.

Function/Count Byte

Function/Count byte 303 contains the encoding/decoding 'key' and the number of bytes of the command data being transmitted. In the particular example shown in FIG. 3, the 'function' portion is made up of bits 7 and 6 in byte 303. With two bits, the total possible 'functions' is four. The possible functions may be represented by a table, which indicate the manner in which the data field is encoded. In addition, the function bits determine where inverse function/count byte 307 and random byte 309 are located within the data field. Furthermore, the function bits are randomly selected from the above mentioned table by an encoder. The encoder may be located in a base station, a remote control, in the front of a train, or any other place where an originator is configured to transmit commands to a model train system. The random selection of the function bits allows for the signature or overall number sequence to be unique. The purpose of this random selection is to select the low level encoding and decoding functions. The encoder randomly selects the predetermined function and the order in which the encoding is to be performed. As a result, an identical command sent twice to a receiver may have two different signatures due to the fact that each command may be encoded by a different technique. A decoder located in a microprocessor within a model train system performs the decoding process at which point the decoder can determine which random method was used to encode the data set. The encoder and decoder are the only two systems that know the methods used to create and return the original data. The data itself does not provide any function or order of information that could be used to decode the data. Thus, a secure method to encode and decode the data set is possible.

The 'count' portion of byte 303 is made up of bits 5 through 0. These bits indicate the number of bytes of original data being transmitted. In other words, the count bits correspond to how many bytes command data 305 occupies. For example, if command 305 is 4 bytes, then bits 5 through 0 can be represented as '4' in binary code or '000100'. Using 6 count bits, the maximum size of a command in the current example is 63 bytes. It should be appreciated that the function and count field could be separated or consist of more than one byte so that more functions and larger commands could be implemented.

Data Field

The data field is located between function/count byte 303 and error byte 311. A desired command 305 to be executed by the model train system is located within the data field section of the signature. Command 305 may consist of any number of bytes. Examples of commands are opening/closing couplers that connect train cars together, producing a bell or whistle sound, turning on/off lights, etc. In the particular example shown in FIG. 3, the command has the size range of 2 to 63 bytes. Inverse function byte 307 is the inverse of function/count byte 303. For example, before encoding, if function/count byte 303 were to consist of the binary sequence '00000100' which may also be referred as '04' in hexadecimal format, inverse function byte 307 would be '11111011' or 'FB' in hexadecimal format. The location of inverse function byte 307 is determined by the function bits in byte 303.

Random byte 309 within the data field influences the overall makeup of the data signature. The location of random byte 309 is variable depending on the function selected. Random data is generated by the encoder and placed in the data field. Then, the entire data field is encoded into the signature. This technique multiplies the number of possible signature patterns that can be created with any given data set. For example, as described above, if four functions were used to encode the data set, four signatures would be created. By introducing additional bits (i.e., extra random data) that are independent of the data field, the total signatures possible is increased by powers of 2. Therefore, if 16 random bits or 2 bytes were introduced into the data field, a total of 2^16 or 65,536 possibilities would be created. These possibilities combined with the four functions from the function bits in byte 303 create 262,144 possibilities of the same data set. Furthermore, using a data field of 65,536 commands or 16 bits would create 17,179,869,184 possible signatures (65,536 commands * 65,536 possibilities of random data * 4 functions=17,179,869,184). This makes the idea of a brute force technique of sending a known command over and over until all the possibilities have been sent and then using the known possible signatures to lookup a data set impractical if not impossible because of the memory and resources required to complete this task. The location of the random data is only known by the encoder and decoder and would be removed during the data recovery phase.

Error Bytes

Error byte 301 is the 8 bit summation (with carry discarded) of function/count byte 303 with the entire data field. Error byte 301 is always the first byte in the signature. Error byte 311 is a redundant compliment of error byte 301. Error byte 311 is always located in the last position of the signature. The use of error bytes provides for a check to see whether data is properly transmitted/received. The purpose of second error byte 311 is to check for any external interference, such as noise, during the transmission of data. The concept of placing the error bytes at the beginning and the end of a signature is based on the way that transmissions may overlap. By placing an error byte at the beginning and at the end of a signature, any interference that occurs on the ends of a signature will cause the relationship between the both error bytes to disagree, causing the data to be viewed as corrupt.

Encoding

Figure 4:
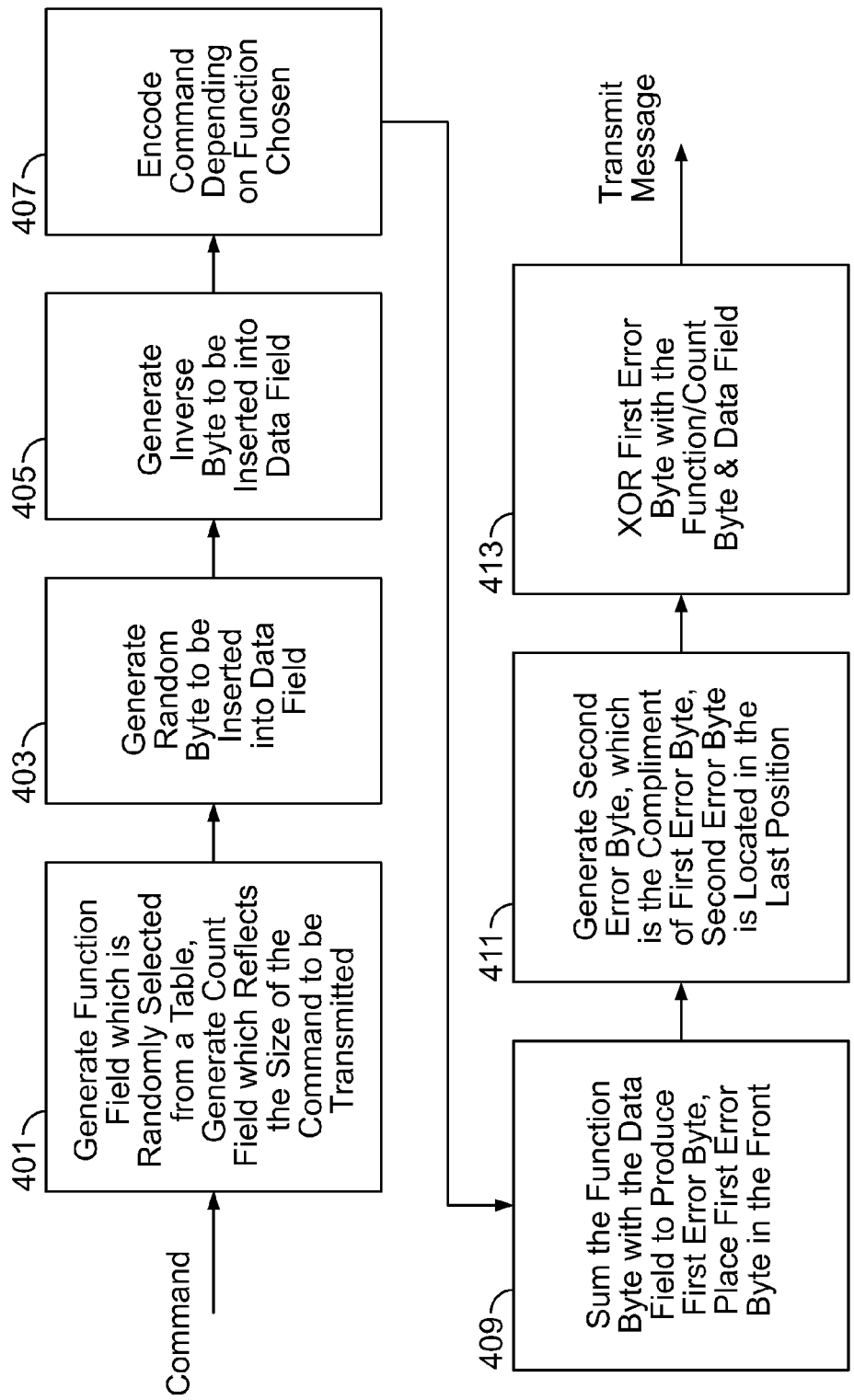
FIG. 4 illustrates the steps taken to encode a signature.

FIG. 4 illustrates an example of the encoding method of the present invention. The encoding process may be implemented through hardware and/or software. First, command 305 to be executed by a model train system is identified and entered into an encoder. Command 305 may be chosen by a user through a remote control, where a microprocessor or other circuitry located in the remote control processes command 305. Next, as shown in step 401 in FIG. 4, the 'count' portion of function/count byte 303 is generated to reflect the size of the command being transmitted. In addition, an encoder which may be located within the remote control generates a function field within function/count byte 303 which is randomly selected from a table. It should be appreciated that a 'field' can represent any number of bits of data to be transmitted within the communication system. The function/count byte is placed in front of the data field.

In the particular example in FIG. 4, two function bits are randomly chosen from a table. An example of such a table is shown in FIG. 5. Four possible combinations of the function bits exist: '00', '01', '10', and '11'. Each combination indicates how the encoder should encode the data, and also where within the data field the inverse function/count byte is located. Function bit sequence '00' corresponds to the inverse function/count byte being the second byte from the end of the data field. The method of encoding for this bit sequence is to compliment (i.e., invert) all the data field bits. Function bit sequence '01' corresponds to the inverse function/count byte being the first byte in the data field. The method of encoding for this bit sequence is to XOR all the data field bits with the function/count byte. Function bit sequence '10' corresponds to the inverse function/count byte being the last byte in the data field. The method of encoding for this bit sequence is to ADD the inverse function/count byte to all the data field bytes, and then SWAP the front and back nibbles (i.e., a nibble is half of a field). Swapping results in exchanging the first four bits with the last four bits of a byte, and likewise having the last four bits become the first four bits. Function bit sequence '11' corresponds to the inverse function/count byte being the second to last byte in the data field. The method of encoding for this bit sequence is to XOR the fixed value 0xAA with the data field, and then ADD the function/count byte to the result. It should be appreciated that more functions could be implemented, where more function bits are used in the encoding system.

Next, in step 403, the encoder generates random byte 309 to be inserted into the data field. Then, in step 405, inverse function/count byte 307 is generated and inserted into the data field according to the function bits selected and described in FIG. 5. Inverse function/count byte 307 as shown in FIG. 3 reflects the function bit sequence '00' because inverse function/count byte 307 is the second byte from the end of the data field. Next, in step 407, the encoder takes the data field and encodes the data based on the function which was randomly selected. After, the first error byte 301 is generated in step 409 by summing the function/count byte with the entire data field. Error byte 301 is placed in the beginning part of the signature. Second error byte 311 is generated in step 411, where second error byte 311 is the compliment of first error byte 301. Second error byte is placed in the last position of the signature. After step 411 is completed, the entire signature is in place, and the last step before transmitting the message is to XOR the first error byte with the function/count byte and the data field, as shown in step 413. Then, the signature is transmitted to a receiver which may be located on a model train. Once received, the data is ready to then be decoded.

Although one embodiment has been described above, the present invention can be embodied in other specific ways without departing from the essential characteristics of the invention. For example, rather than performing step 403, where the random byte is generated and inserted in the data field, before step 405, the encoding process could involve step 405 being executed before step 403 and result in the same signature, without departing from the main aspect of the present invention.

Decoding

Figure 6:
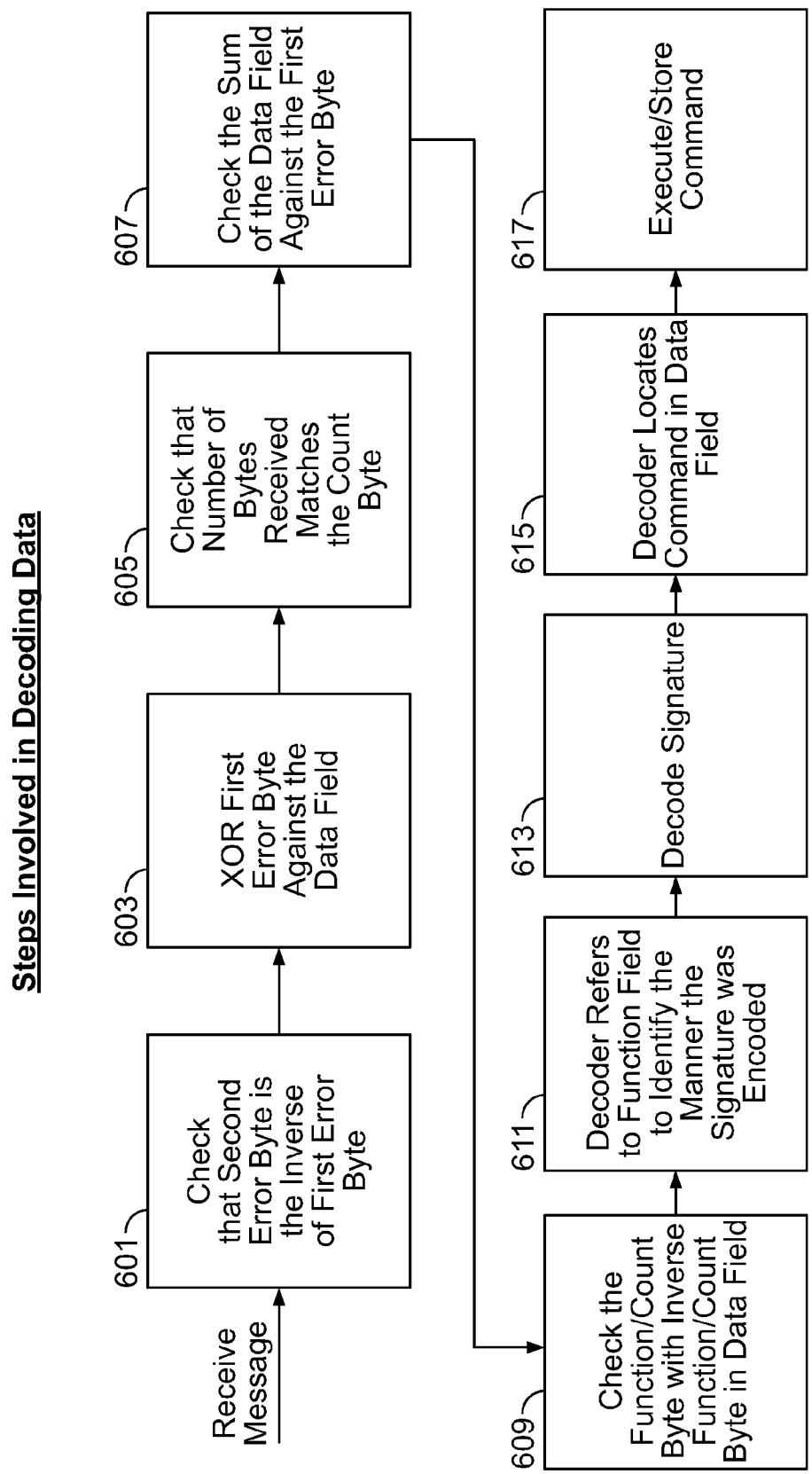
FIG. 6 illustrates the steps taken to decode a signature.

FIG. 6 illustrates an example of the decoding method of the present invention. A decoding system may be located within a model train and implemented with hardware and/or software. After the signature has been received by the decoding system, a check is performed to verify whether the first error byte agrees with the inverse of the second error byte, as shown in step 601. Next, in step 603, the data field is XORed with the first error byte. Then, the decoding system proceeds to check the data for validity. Several checks are used to determine if the decoded data is valid:

1. The count byte matches the number of bytes received (Step 605).

2. The first error byte equals the rollover sum of the data field and function/count byte (Step 607).

3. The function/count byte agrees with the inverse function byte (Step 609).

If any of these checks are found to disagree, then the data is disregarded. If the checks are found to all be in agreement, then step 611 is executed where the decoder refers to the function field to identify the manner in which the signature was encoded. In step 613, the decoder takes this information and decodes the signature back to the original sequence. Then, in step 615, the decoder locates command 305 within the data field. Finally, in step 617, command 305 is extracted, and can be executed and/or stored.

Although one embodiment has been described above, the present invention can be embodied in other specific ways without departing from the essential characteristics of the invention. For example, rather than performing step 603, where the second error byte is checked against the first error byte, before step 605, the decoding process could involve step 605 being executed before step 603 and result in the same outcome, without departing from the main aspect of the present invention. Furthermore, additional checks independent of this method could be imbedded into the data field providing additional protection against tampering or interference.

Specific Example of Encoding and Decoding

Figure 7:
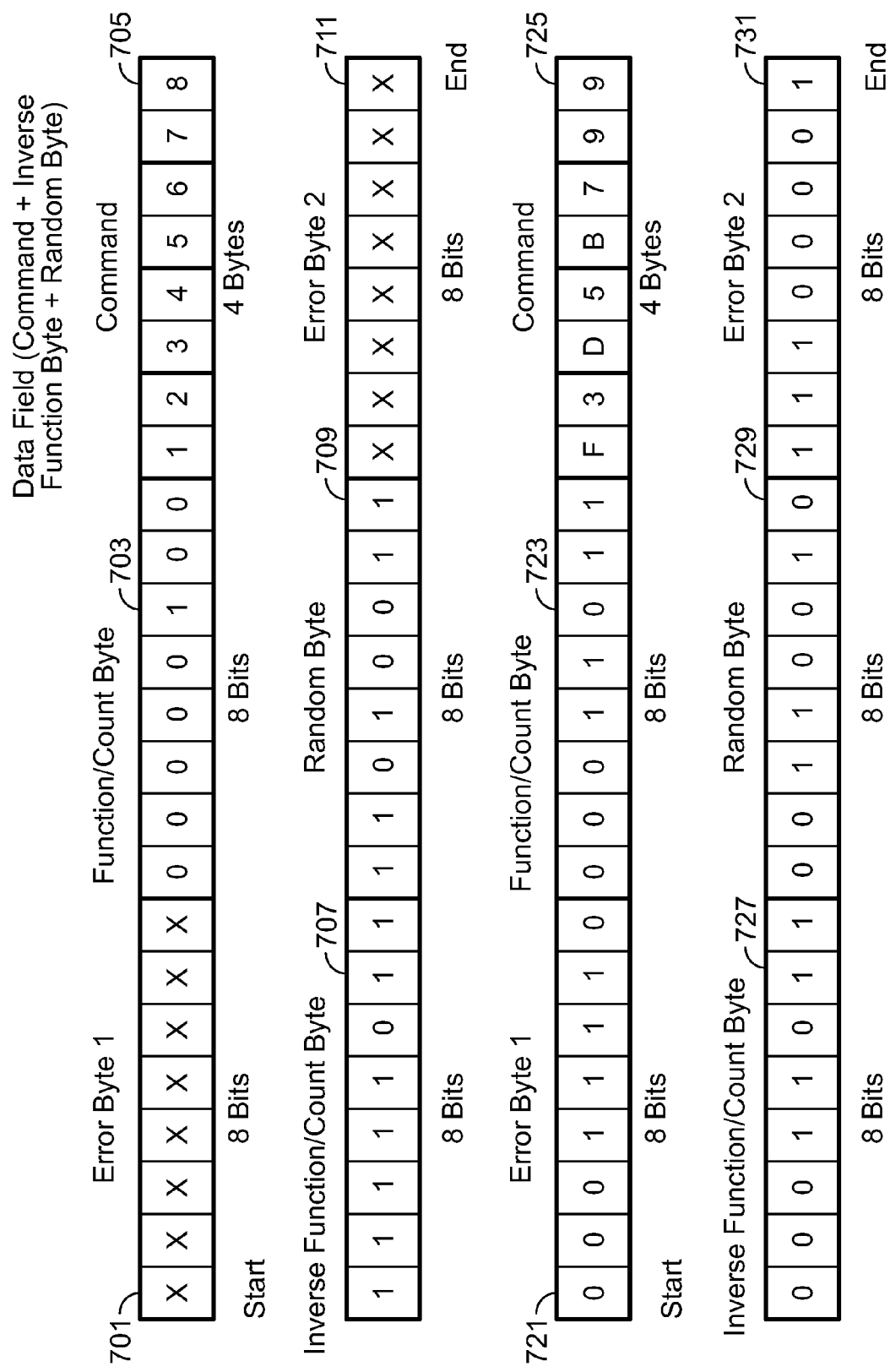
FIG. 7 illustrates the composition of a signature reflecting a specific example of encoding and decoding a command.

The following example is used to illustrate an embodiment of encoding and decoding in the present invention. It should be appreciated that the number of functions, number of bytes, and the number of random bytes in a signature can all be changed to fit particular applications and not deviate from the essential characteristics of the present invention. FIG. 7 illustrates the signature of this particular example. Let the original command 705 consist of 4 bytes, where these four bytes can be represented by the hexadecimal symbols $(12)_{HEX}$, $(34)_{HEX}$, $(56)_{HEX}$, and $(78)_{HEX}$. The encoder randomly selects function bits '00' from the table shown in FIG. 5 which corresponds to placing the inverse function/count byte as the second byte from the end of the data field, and complimenting all the data field bytes. Also, the count bits are selected as '000100' (i.e., 4 in binary) to indicate that the command consists of 4 bytes. Thus, function/count byte can be represented as '00000100' as shown in byte 703. Next, the encoder generates random byte $(D3)_{HEX}$ or '11010011' and inserts random byte 709 into the data field. Inverse function/count byte 707 which is the inverse of function/count byte 703 is then generated as '11111011' and placed into the data field. The encoder then proceeds to encode the command according to the function bits selected. In this particular example, since '00' was selected, the data field bytes are inverted and results in the data field sequence '11101101' or $(ED)_{HEX}$, '11001011' or $(CB)_{HEX}$, '10101001' or $(A9)_{HEX}$, '10000111' or $(87)_{HEX}$, '00000100' or $(04)_{HEX}$, and '00101100' or $(2C)_{HEX}$. Next, the first error byte is produced by taking the sum of the data field with the function/count byte resulting in '00011110' or $(1E)_{HEX}$ and placed in location 721. Then, the second error byte, which is the inverse of the first error byte, is generated as '11100001' or $(E1)_{HEX}$ and placed in location 731. Before transmission takes place, the function/count byte and data field is XORed with first error byte 721 resulting in byte 723 being '00011011' or $(1B)_{HEX}$, and encoded command 725 as $(F3)_{HEX}$, $(D5)_{HEX}$, $(B7)_{HEX}$, and $(99)_{HEX}$. Encoded inverse function/count byte 727 is $(E5)_{HEX}$ and encoded random byte 729 is $(32)_{HEX}$.

During the decoding process, the encoded signature is XORed with first error byte 721 resulting in the original data field. The following checks are implemented:

1. The first error byte $(E1)_{HEX}$ agrees with the inverse of the second error byte.

2. The count byte $(04)_{HEX}$ matches the number of bytes received, i.e. 4.

3. The first error byte $(E1)_{HEX}$ equals the sum of the data field and function/count byte.

4. The function/count byte $(04)_{HEX}$ agrees with the inverse function byte.

Then the decoder refers to the function field to identify the manner in which the signature was encoded. Next, the decoder takes this information and decodes the signature back to the original sequence. The decoder locates command 705 within the data field. Finally, the command is extracted and executed and/or stored.

Using the same command $(12)_{HEX}$, $(34)_{HEX}$, $(56)_{HEX}$, $(78)_{HEX}$ and random byte $(D3)_{HEX}$, if function 1 were to be randomly selected by the encoder, the signature result would be $(F2)_{HEX}$, $(B7)_{HEX}$, $(0D)_{HEX}$, $(64)_{HEX}$, $(A5)_{HEX}$, $(83)_{HEX}$, $(E1)_{HEX}$, $(CF)_{HEX}$, $(0D)_{HEX}$. Using the same command $(12)_{HEX}$, $(34)_{HEX}$, $(56)_{HEX}$, $(78)_{HEX}$ and random byte $(D3)_{HEX}$, if function 2 were to be randomly selected by the encoder, the signature result would be $(4F)_{HEX}$, $(35)_{HEX}$, $(36)_{HEX}$, $(D4)_{HEX}$, $(F2)_{HEX}$, $(90)_{HEX}$, $(CA)_{HEX}$, $(EF)_{HEX}$, $(B0)_{HEX}$. Using the same command $(12)_{HEX}$, $(34)_{HEX}$, $(56)_{HEX}$, $(78)_{HEX}$ and random byte $(D3)_{HEX}$, if function 3 were to be randomly selected by the encoder, the signature result would be $(90)_{HEX}$, $(55)_{HEX}$, $(AE)_{HEX}$, $(C5)_{HEX}$, $(ED)_{HEX}$, $(F3)_{HEX}$, $(51)_{HEX}$, $(07)_{HEX}$, $(6F)_{HEX}$.

APPLICATIONS AND ADVANTAGES

There are a number of advantages of the present invention. The transmission and reception of a signature is located in the public domain and may be misinterpreted or intercepted and used for an application other than for which it was intended. This creates the need to produce the present invention of a command protocol for sending data between systems without the concern of its unintended use. The method described provides a unique identification method to prove that this method was used to either encode or decode the data being protected. This allows the data set being protected to be straight forward and easy to use for the devices for which it was intended without the concern of unwanted parties to view the data, or using it for their profit and gain.

The present invention uses the mathematic principals of non-destructive operations and order of operations. This creates an ordered sequence of operations that when applied to a data set creates a signature unique to that data. The operations and order of encoding are stored in both the data and the encoding and decoding members. This requires the knowledge of both the encoded and decoded data being sent and the exact functions and order of operations used by the encoder and decoder.

An example of non-destructive mathematics begins by using a number to represent a set of data that needs to be encoded. Next, a non-destructive mathematical function is selected. One example of a non-destructive mathematical function is the addition principal, whereby any selected number is added to the original data set. The result becomes the data set plus the selected number. To recover the original number, the inverse of the addition principal is performed (i.e., the inverse of addition is subtraction). The result is the original data set. Other examples of non-destructive mathematics include XOR, rotation, and bit position swapping. In addition, if a selected number to add is only known by the encoder and decoder, then there is proof that the encoding and decoding method described was used.

The mathematical functions and order of execution are also excellent methods for determining if the data has been changed. This is because a different set of encoded input will cause the decoded data to end up with a different result. This is due to the fact that the data itself is used to determine how it is decoded and which algorithms are used. The introduction of random data into the data field expands the number of possibilities by powers of 2. Further, any combination of non-destructive mathematical functions, the order in which they are processed, the number of functions used, or the number of random bits introduced into the data field would not have to be defined.

Furthermore, there are a number of applications pertaining to the present invention. A signature transmitted may consist of an internal message between different systems within a train. For example, a locomotive may transmit a signature to a train station containing the number of cars connected in a train, where this number is displayed at the train station. Thus, an encoded signature does not necessarily include an executable command, and could also include information about the model train layout (i.e., engine information, cargo information, etc.). Other applications of signatures being transmitted within a model train communication system include transmitting data between a remote control and a base station via a 2.4 GHz carrier, and transmitting data via a RS232 port to outside devices.

It will be understood that modifications and variations may be effected without departing from the scope of the novel concepts of the present invention. For example, additional checks could be implemented during the decoding process to verify that the data received is valid. Accordingly, the foregoing description is intended to be illustrative, but not limiting, of the scope of the invention which is set forth in the following claims.

What is claimed is:

1. A method for encoding a variable length signature in a model train communication system, said method comprising:
   generating a first error field and a second error field located on the ends of a data field, where wherein the second error field is the inverse of the first error field;
   generating a function field located in between said first and second error fields, wherein said function field indicates the manner in which said data field is encoded; and
   generating a count field located in between said first and second error fields, wherein said count field indicates the number of bytes of said command data being transmitted,
   wherein said signature is transmitted through a communication link in a model train system.

2. The method of claim 1 wherein said data field comprises a desired command for a model train system.

3. The method of claim 1 wherein said data field comprises information regarding the model train layout for a model train system.

4. The method of claim 1 wherein said function field is chosen randomly from a group of functions.

5. The method of claim 4 wherein said functions comprise inverse, XOR, rotation, and bit position swapping.

6. The method of claim 1 wherein said function field specifies the inverse of the function/count field at some location in said data field.

7. The method of claim 1 wherein said function field further specifies the location of a random field in said data field.

8. The method of claim 1 wherein said first error field is used to XOR said function, count, and data field.

9. A method for decoding a variable length signature in a model train communication system, said method comprising:
   comparing a first error field in relation to a second error field, where wherein the second error field is the inverse of the first error field;
   comparing the number of bytes received to a count field, wherein said count field indicates the expected number of bytes to be received;
   comparing said first error field in relation to a data field; and
   analyzing a function/count field located in between said first and second error fields to decode a data field, wherein said signature is received by a communication link in a model train system.

10. The method of claim 9 wherein said data field comprises a desired command for a model train system.

11. The method of claim 9 wherein said data field comprises information regarding the model train layout for a model train system.

12. The method of claim 9 wherein said function field is chosen randomly from a group of functions.

13. The method of claim 9 wherein said function field specifies the inverse of the function/count field at some location in said data field.

14. The method of claim 9 wherein said function field further specifies the location of a random field in said data field.

15. The method of claim 9 wherein said first error field is used to XOR said function, count, and data field.

16. An apparatus for encoding a variable length signature in a model train communication system containing a processor having a memory storing a program, said memory including encoded commands for:
   generating a first error field and a second error field located on the ends of a data field, wherein the second error field is the inverse of the first error field;
   generating a function field located in between said error fields, wherein said function field indicates the manner in which said data field is encoded; and
   generating a count field located in between said error fields, wherein said count field indicates the number of bytes of said command data being transmitted, wherein said signature is transmitted through a communication link in a model train system.

17. The apparatus of claim 16 wherein said data field comprises a desired command for a model train system.

18. The apparatus of claim 16 wherein said data field comprises information regarding the model train layout for a model train system.

19. An apparatus for decoding a variable length signature in a model train communication system containing a processor having a memory storing a program, said memory including encoded commands for:

comparing a first error field in relation to a second error field, wherein the second error field is the inverse of the first error field;

comparing the number of bytes received to a count field, wherein said count field indicates the expected number of bytes to be received;

comparing said first error field in relation to a data field; and analyzing a function/count field located in between said first and second error fields to decode a data field, wherein said signature is received by a communication link in a model train system.

20. The apparatus of claim 19 wherein said data field comprises a desired command for a model train system.

21. The apparatus of claim 19 wherein said data field comprises information regarding the model train layout for a model train system.

* * * * *